A. H. LENT.
PIVOT LIGHT.
APPLICATION FILED JULY 21, 1909.

967,207.

Patented Aug. 16, 1910.

Witnesses
J. D. McLaughlin
H. Joseph Doyle

Inventor
Alfred H. Lent
By E. E. Vrooman,
Attorney.

UNITED STATES PATENT OFFICE.

ALFRED H. LENT, OF OAKLAND, CALIFORNIA.

PIVOT-LIGHT.

967,207.

Specification of Letters Patent.  Patented Aug. 16, 1910.

Application filed July 21, 1909. Serial No. 508,818.

*To all whom it may concern:*

Be it known that I, ALFRED H. LENT, citizen of the United States, residing at Oakland, in the county of Alameda and State of California, have invented certain new and useful Improvements in Pivot-Lights, of which the following is a specification.

This invention relates to headlight operating mechanism for motor vehicles in which the said mechanism is connected to the steering gear so that the lights will turn with said gear and project their rays in the direction of travel of the vehicle.

The principal object of the invention is to employ an endless connector for connecting the headlights with the turning gear, the said connector being arranged to one side of the vehicle and operated by the steering shaft.

In carrying out the object of the invention generally stated above, it will be understood, of course, that the essential features thereof are necessarily susceptible of changes in details and structural arrangements, one preferred and practical embodiment of which is shown in the accompanying drawings wherein—

Figure 1:
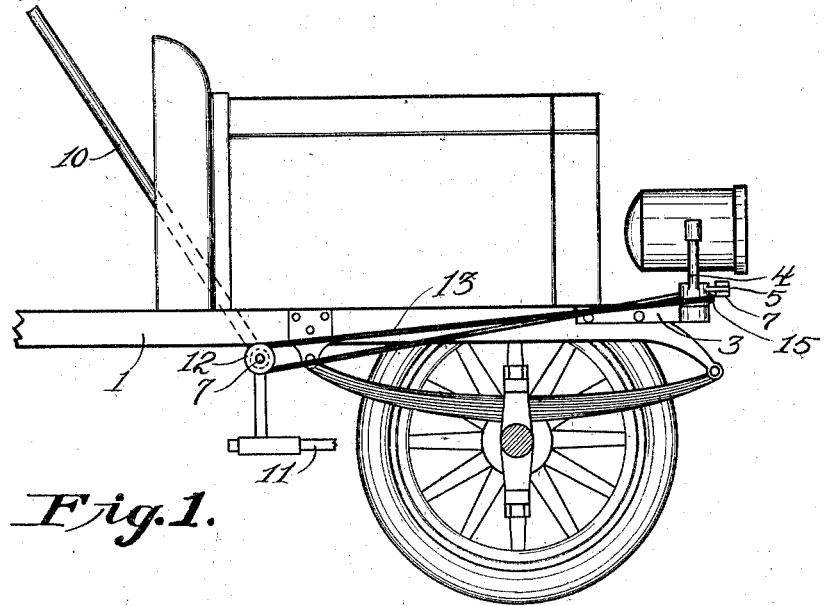
Figure 2:
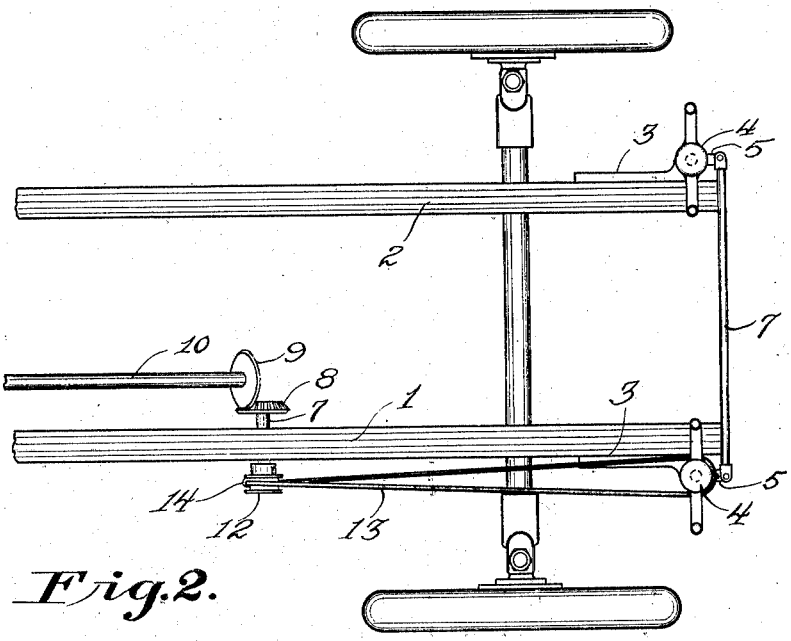

Figure 1 is a fragmentary view in side elevation of the forward end of a motor vehicle showing the present invention applied thereto. Fig. 2 is a top plan view, the hood being removed.

Referring to said drawings by numerals, 1 and 2 designate the longitudinal side beams of the frame of a motor vehicle. Said beams carry a lamp bracket 3 at their forward end in which the forks 4 for the lamps are rotatably mounted. Said forks are each provided with a forwardly projecting lip 5, said lips being in pivotal engagement with the ends of a connecting rod 6. The lamp brackets 3 are arranged on the outer sides of the beams 1 and 2 so that the forks are held clear of said beams. A horizontal shaft 7 extends transversely through one of said beams, the inner end of said shaft carrying a bevel gear 8 which is held in mesh with a similar gear 9 carried by the lower end of a steering shaft 10 which operates the usual front wheel turning rod 11. The outer end of said shaft 7 has a spool 12 fast thereon and over which an endless connector 13, such as a belt, cable or the like, is looped and fastened thereon by means of a staple 14 or equivalent fastener, said connector being also twisted and then looped over one of the lamp forks and fastened thereon by means of a staple 15 or the like.

From the foregoing it will be seen that when the shaft 10 is rotated, the endless connector will immediately impart such movement to one of the lamp forks and, as said forks are connected, both will turn together.

What I claim as my invention is:—

1. In a motor vehicle, the combination with the steering shaft, of a shaft operated thereby, a spool carried by said shaft, lamp forks rotatably mounted on opposite sides of said vehicle, a connecting rod for said forks, and an endless connector fastened to one of said forks and also to said spool.

2. In a motor vehicle, the combination with a steering shaft and oppositely disposed lamp forks, of a gear carried by said shaft, a transverse shaft carried by the vehicle, a gear carried by one end of said transverse shaft and in mesh with the gear of said steering shaft, a spool carried by the other end of said transverse shaft, a connector fastened to said spool and one of said forks to cause the same to rotate in unison, and a connecting rod for the said forks.

3. In a motor vehicle, the combination with the frame thereof provided with oppositely disposed rotatable lamp forks, a connector between said forks to rotate the same together, a steering shaft provided with a gear, a transverse shaft having a gear in mesh with said gear, a spool fast on said transverse shaft, and an endless connector for said spool and one of said forks.

4. In a motor vehicle, the combination with the frame composed of longitudinal side beams, a rotatable lamp fork carried by the outer face of each beam, a steering shaft, a shaft extending through one of said beams and geared to said steering shaft, a spool carried by the outer end of said beam shaft and held beyond said beam, an endless connector between said spool and one of said lamp forks, and a pivotal connection between said forks.

In testimony whereof I affix my signature in presence of two witnesses.

ALFRED H. LENT.

Witnesses:
H. C. SCHROEDER,
F. P. SCHROEDER.